US010986240B2

(12) United States Patent
Ota

(10) Patent No.: US 10,986,240 B2
(45) Date of Patent: Apr. 20, 2021

(54) COMMUNICATION DEVICE, LOG TRANSFER METHOD, AND COMMUNICATION SYSTEM

(71) Applicant: Hiroshi Ota, Tokyo (JP)

(72) Inventor: Hiroshi Ota, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/795,965

(22) Filed: Feb. 20, 2020

(65) Prior Publication Data

US 2020/0280643 A1 Sep. 3, 2020

(30) Foreign Application Priority Data

Feb. 28, 2019 (JP) ............................ JP2019-036968

(51) Int. Cl.
*H04N 1/00* (2006.01)
*G06F 1/3203* (2019.01)

(52) U.S. Cl.
CPC ....... *H04N 1/00312* (2013.01); *G06F 1/3203* (2013.01); *H04N 1/00278* (2013.01); *H04N 2201/0039* (2013.01); *H04N 2201/0094* (2013.01)

(58) Field of Classification Search
None
See application file for complete search history.

(56) References Cited

U.S. PATENT DOCUMENTS

2016/0234032 A1* 8/2016 Rabii ...................... H04L 65/80
2017/0132572 A1* 5/2017 Joo .................... G06Q 10/1093
2018/0124094 A1* 5/2018 Hamdi ................ H04L 63/1433

FOREIGN PATENT DOCUMENTS

JP 2005-215856 8/2005
JP 2011-044807 3/2011

* cited by examiner

*Primary Examiner* — Lennin R Rodriguezgonzalez
(74) *Attorney, Agent, or Firm* — Oblon, McClelland, Maier & Neustadt, L.L.P.

(57) ABSTRACT

A communication device is configured to relay or capture communication performed between a plurality of information processing apparatuses. The communication device includes circuitry configured to: generate a log indicating a record of the communication performed between the plurality of information processing apparatuses; store the generated log in a memory; infer which one of a normal mode or and energy saving mode an operation state of a transfer destination device is, based on content of communication performed between a transfer destination apparatus and another information processing apparatus in a predetermined latest period; and controls transfer of the log based on a result obtained by inferring by the circuitry, so that the circuitry transfers the log to the transfer destination apparatus in a case where the result indicates the normal mode, and the circuitry postpones a transfer of the log in a case where the result indicates the energy saving mode.

9 Claims, 8 Drawing Sheets

| # | destIPaddr:port | srcIPaddr:port | protocol |
|---|---|---|---|
| 1 | 192.168.1.100:161 (MFP) | 192.168.1.200:56476 (TERMINAL APPARATUS A) | UDP |
| 2 | 192.168.1.100:161 (MFP) | 192.168.2.200:53476 (TERMINAL APPARATUS B) | UDP |
| 3 | 192.168.1.100:161 (MFP) | 192.168.1.200:36476 (TERMINAL APPARATUS A) | UDP |
| 4 | 192.168.1.100:161 (MFP) | 192.168.1.200:26472 (TERMINAL APPARATUS B) | UDP |

| # | destIPaddr:port | srcIPaddr:port | protocol |
|---|---|---|---|
| 1 | 192.168.1.100:161 (MFP) | 192.168.1.200:56476 (TERMINAL APPARATUS A) | UDP |
| 2 | 192.168.1.100:9100 (MFP) | 192.168.2.200:53476 (TERMINAL APPARATUS B) | TCP |
| 3 | 192.168.1.100:161 (MFP) | 192.168.1.200:36476 (TERMINAL APPARATUS A) | UDP |
| 4 | 192.168.1.100:161 (MFP) | 192.168.1.200:26472 (TERMINAL APPARATUS B) | UDP |

| time | destIPaddr:port | srcIPaddr:port | protocol |
|---|---|---|---|
| 2019/10/01 13:31:29 | 192.168.1.100:161 (MFP) | 192.168.1.200:56476 (TERMINAL APPARATUS A) | UDP |
| 2019/10/01 13:31:35 | 192.168.1.100:161 (MFP) | 192.168.2.200:53476 (TERMINAL APPARATUS B) | UDP |
| 2019/10/01 13:32:42 | 192.168.1.100:161 (MFP) | 192.168.1.200:36476 (TERMINAL APPARATUS A) | UDP |
| 2019/10/01 13:33:53 | 192.168.1.100:161 (MFP) | 192.168.1.200:26472 (TERMINAL APPARATUS A) | UDP |
| 2019/10/01 13:34:27 | 192.168.1.100:161 (MFP) | 192.168.1.200:56476 (TERMINAL APPARATUS A) | UDP |
| 2019/10/01 13:35:47 | 192.168.1.100:9100 (MFP) | 192.168.2.200:53476 (TERMINAL APPARATUS B) | TCP |
| 2019/10/01 13:36:07 | 192.168.1.100:161 (MFP) | 192.168.1.200:36476 (TERMINAL APPARATUS A) | UDP |
| 2019/10/01 13:37:11 | 192.168.1.100:161 (MFP) | 192.168.1.200:26472 (TERMINAL APPARATUS A) | UDP |

COMMUNICATION DEVICE, LOG TRANSFER METHOD, AND COMMUNICATION SYSTEM

CROSS-REFERENCE TO RELATED APPLICATION

This patent application is based on and claims priority pursuant to 35 U.S.C. § 119(a) to Japanese Patent Application No. 2019-036968, filed on Feb. 28, 2019, in the Japan Patent Office, the entire disclosure of which is hereby incorporated by reference herein.

BACKGROUND

Technical Field

The present disclosure relates to a communication device, a log transfer method, and a communication system.

Description of the Related Art

In the related art, a communication device connected to a network records communications flowing over the network as a log. If a storage device that stores a log has a limited capacity in such a communication device, the communication device transfers the log to an information processing apparatus such as a server apparatus or a multifunction peripheral/product/printer (MFP). In this way, the log is stored in a storage device such as a hard disk drive (HDD) of the information processing apparatus.

When a no-operation state continues, a certain type of the aforementioned information processing apparatus operates in an energy saving mode in which power consumption is reduced. For example, when processing such as printing is not performed for a predetermined time period, an MFP transitions to the energy saving mode to reduce power consumption of the entire MFP. In the related art, there have been proposed techniques for recording a log of communication relating to an apparatus such as an image forming apparatus or an MFP while keeping the apparatus in an energy saving mode.

SUMMARY

According to an embodiment, a communication device is configured to relay or capture communication performed between a plurality of information processing apparatuses communicable with one another via a network. The communication device includes circuitry configured to: generate a log indicating a record of the communication performed between the plurality of information processing apparatuses; store the generated log in a memory; infer which one of a normal mode or and energy saving mode an operation state of a transfer destination device is, based on content of communication performed between a transfer destination apparatus and another information processing apparatus in a predetermined latest period, the transfer destination apparatus being a particular information processing apparatus to which the log is to be transferred among the plurality of information processing apparatuses, the another information processing apparatus being another particular information processing apparatus other than the transfer destination apparatus among the plurality of information processing apparatuses; and controls transfer of the log based on a result obtained by inferring by the circuitry, so that the circuitry transfers the log to the transfer destination apparatus in a case where the result indicates the normal mode, and the circuitry postpones a transfer of the log in a case where the result indicates the energy saving mode.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 6A and FIG. 6B are diagrams each illustrating an example of session information stored in a session table according to an embodiment;

FIG. 7 is a diagram illustrating an example of a communication log stored in a log storage unit according to an embodiment;

DETAILED DESCRIPTION

Figure 1:
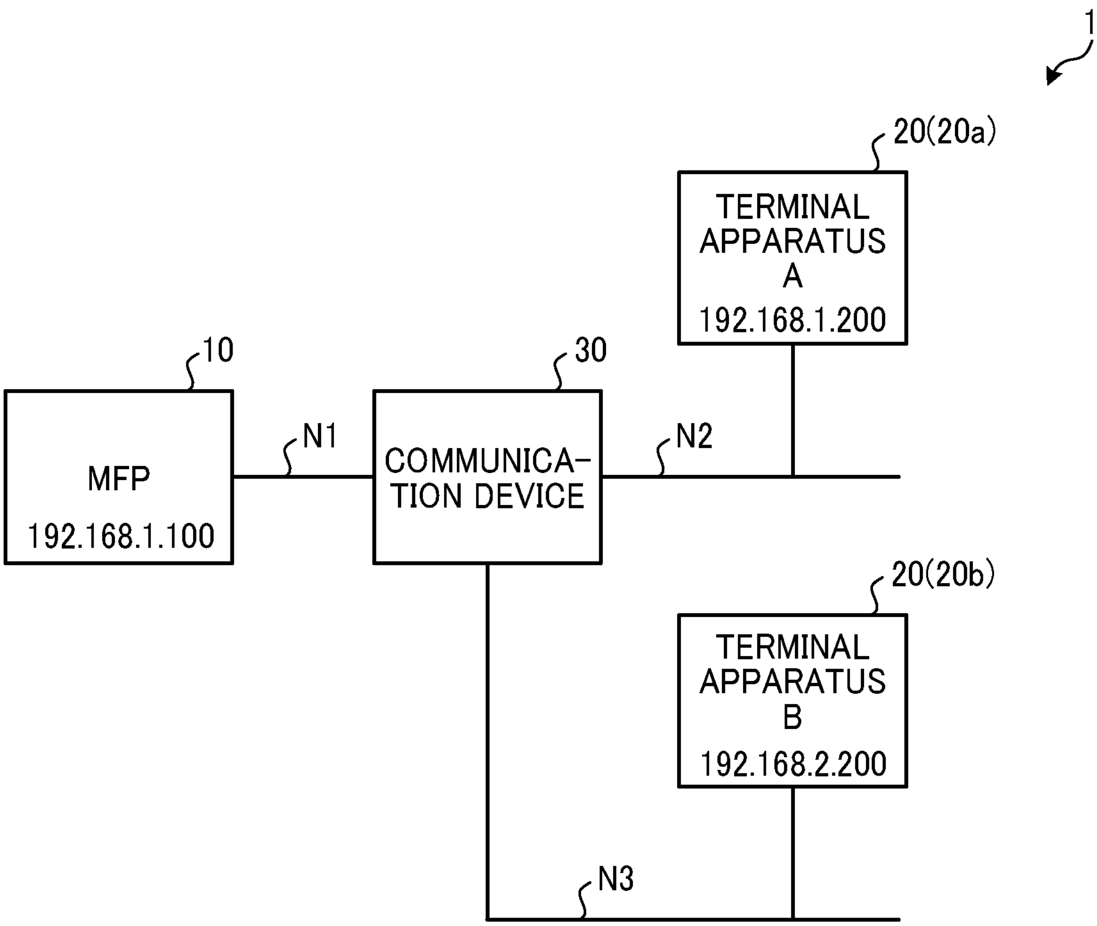
FIG. 1 is a diagram illustrating an example of a system configuration of a communication system according to an embodiment.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

A communication device, a log transfer method, and a communication system according to an embodiment of the present disclosure will be described in detail below with reference to the accompanying drawings.

FIG. 1 is a diagram illustrating an example of a system configuration of a communication system 1 according to an embodiment. The communication system 1 according to the embodiment includes a multifunction peripheral/product/printer (MFP) 10, terminal apparatuses 20 (a terminal apparatus 20*a* and a terminal apparatus 20*b*), and a communication device 30.

The MFP 10 is an apparatus having multiple functions such as a print function, a copy function, and a scan function.

Each of the terminal apparatuses 20 is a general-purpose computer such as a desktop computer, a laptop computer, a tablet terminal, or a smartphone that is operated by a user. Herein, each of the MFP 10 and the terminal apparatuses 20 is an example of an information processing apparatus.

The communication device 30 is a communication device that relays communication performed between information processing apparatuses that are connected to each other via a network. Specifically, the communication device 30 is connected to the MFP 10 and the terminal apparatuses 20 via networks N1 to N3 and relays communication performed between the MFP 10 and the terminal apparatuses 20. For example, the communication device 30 relays data for printing (hereinafter referred to as print data) that is transmitted from each of the terminal apparatuses 20 to the MFP 10.

It is assumed in the embodiment that the MFP 10 is assigned an Internet Protocol (IP) address of "192.168.1.100" and the terminal apparatus 20*a* is assigned an IP address of "192.168.1.200", and that the MFP 10 and the terminal apparatus 20*a* are in the same network segment ("192.168.1.0/24", for example). It is also assumed that the terminal apparatus 20*b* is assigned an IP address of "192.168.2.200", and that the terminal apparatus 20*b* is in a network segment ("192.168.2.0/24", for example) that is different from the network segment of the MFP 10 and the terminal apparatus 20*a*.

Hardware configurations of the MFP 10, the terminal apparatuses 20, and the communication device 30 will be described next with reference to FIG. 2 to FIG. 4.

Figure 2:
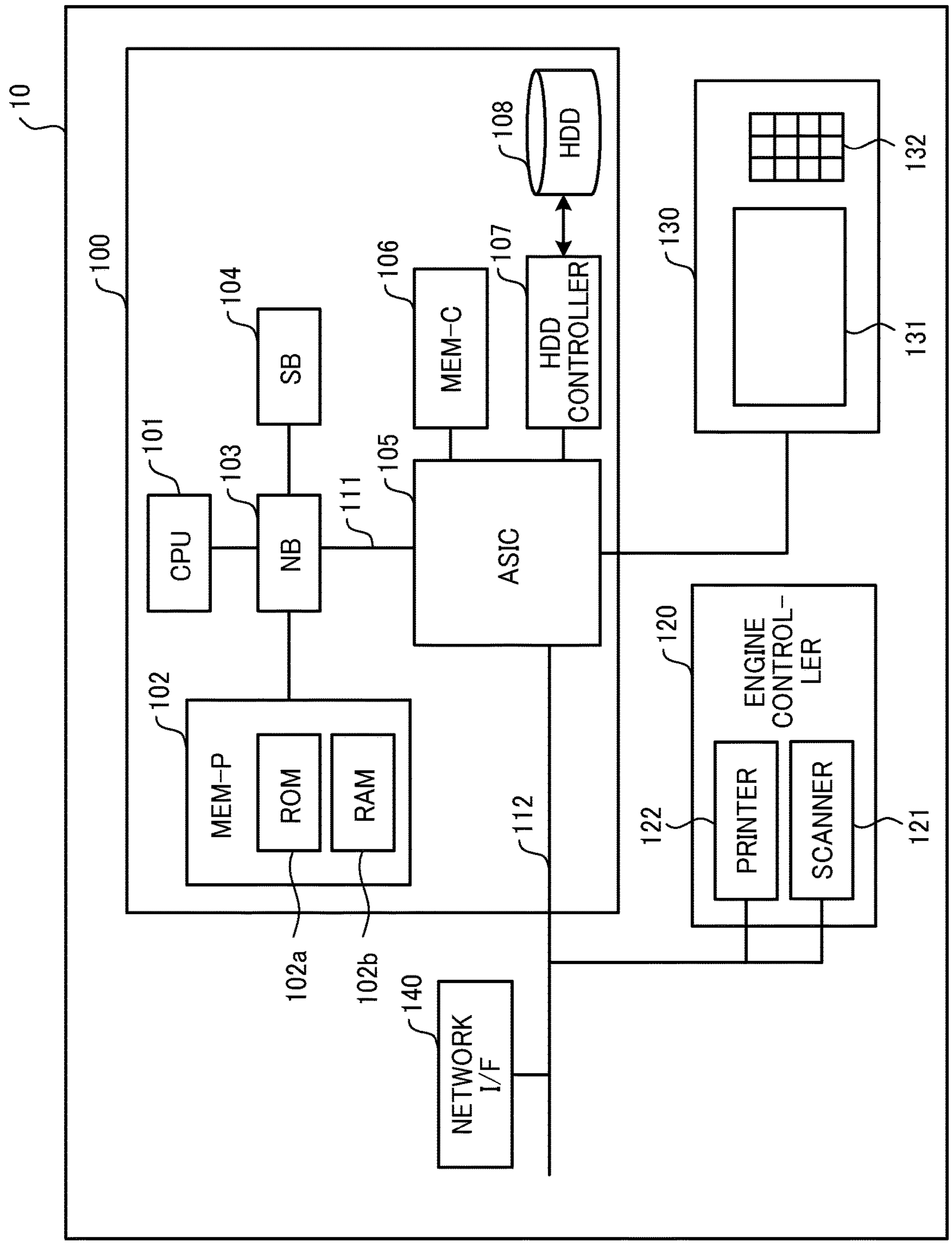
FIG. 2 is a diagram illustrating an example of a hardware configuration of an MFP according to an embodiment.

FIG. 2 is a diagram illustrating an example of a hardware configuration of the MFP 10. As illustrated in FIG. 2, the MFP 10 includes a controller 100, an engine controller 120, a control panel 130, and a network interface (I/F) 140.

The controller 100 includes a central processing unit (CPU) 101 that is a main portion of a computer, a system memory (MEM-P) 102, a northbridge (NB) 103, a southbridge (SB) 104, an application-specific integrated circuit (ASIC) 105, a local memory (MEM-C) 106 that is a storage device, a hard disk drive (HDD) controller 107, and an HDD 108 that is a storage device. The NB 103 and the ASIC 105 are coupled to each other by an Accelerated Graphics Port (AGP) bus 111.

The CPU 101 is a controller that controls entire operation of the MFP 10. The NB 103 is a bridge that couples the CPU 101 to the MEM-P 102, the SB 104, and the AGP bus 111. The NB 103 includes a memory controller that controls reading or writing on the MEM-P 102, a Peripheral Component Interconnect (PCI) master, and an AGP target.

The MEM-P 102 includes a read-only memory (ROM) 102*a* and a random access memory (RAM) 102*b*. The ROM 102*a* is a memory for storing a program and data that implement functions of the controller 100. The RAM 102*b* is used as a memory for loading the program and the data and as a rendering memory at the time of memory printing, for example. The program stored in the RAM 102*b* may be provided after being stored on a computer-readable recording medium, such as a compact disc-read only memory (CD-ROM), a compact disc-recordable (CD-R), or a digital versatile disc (DVD), as a file of an installable or executable format.

The SB 104 is a bridge that couples the NB 103 to a PCI device and a peripheral device. The ASIC 105 is an image-processing-application-specific integrated circuit (IC) including hardware components for image processing. The ASIC 105 has a role of a bridge that couples the AGP bus 111, a PCI bus 112, the HDD 108, and the MEM-C 106 to one another. The ASIC 105 includes a PCI target, an AGP master, an arbiter (ARB) serving as a central processor of the ASIC 105, a memory controller that controls the MEM-C 106, a plurality of direct memory access controllers (DMACs) that perform rotation or the like of image data with a hardware logic, and a PCI unit that transfers data to a scanner 121 and a printer 122 via the PCI bus 112. A Universal Serial Bus (USB) interface or an Institute of Electrical and Electronics Engineers 1394 (IEEE1394) interface may be coupled to the ASIC 105.

The MEM-C 106 is a local memory used as an image buffer for copying and as a code buffer. The HDD 108 is a storage that stores image data, font data used in printing, forms, and a communication log (described later), for example. The HDD controller 107 controls reading of data from or writing of data to the HDD 108 under the control of the CPU 101. The AGP bus 111 is a bus interface for a graphics accelerator card that is devised for accelerating processing of graphics. The AGP bus 111 directly accesses the MEM-P 102 with high throughput to be able to accelerate processing of the graphics accelerator card.

The engine controller 120 includes the scanner 121 and the printer 122. The control panel 130 includes a panel display 131 such as a touch panel, and an operation unit 132. The panel display 131 displays a screen of setting values currently set, a selection screen, and so on and accepts input from a user. The operation unit 132 includes numeral keys that accept setting values of image forming conditions such as color density setting conditions and a start key that accepts a copy start instruction, for example. The controller 100 controls entire operation of the MFP 10. For example, the controller 100 controls rendering, communication, and inputs on the control panel 130. The scanner 121 or the printer 122 includes a component for image processing such as error diffusion and gamma conversion.

An application switching key of the control panel 130 allows the user to sequentially switch between a document box function, a copy function, and a printer function of the MFP 10 to select one of the functions. When the document box function is selected, the MFP 10 transitions to a document box mode. When the copy function is selected, the MFP 10 transitions to a copy mode. When the printer function is selected, the MFP 10 transitions to a printer mode.

The network I/F 140 is an interface used for performing data communication with extraneous sources. The network I/F 140 is electrically coupled to the ASIC 105 through the PCI bus 112.

In the MFP 10 having the configuration described above, in response to acceptance of print data via the network I/F 140, the CPU 101 operates in cooperation with the engine controller 120 to cause the printer 122 to print an image based on the print data on a predetermined sheet.

The CPU 101 also controls the MFP 10 to transition to an operation mode (hereinafter referred to as an "energy saving mode") in which power consumption is less than power consumption in a normal operation mode (hereinafter referred to as a "normal mode"), in response to a period for which the MFP 10 is not used reaching a predetermined period or in response to a predetermined operation being performed on the control panel 130.

Power supply to, for example, the engine controller 120 and the control panel 130 (the panel display 131) is stopped in the energy saving mode. Power supply to the HDD controller 107 and functional units relating to a nonvolatile memory such as the HDD 108 is also stopped in the energy saving mode. However, power supply to the network I/F 140 and functional units relating to communication performed via the network I/F 140 is continued in the energy saving mode. This allows the MFP 10 in the energy saving mode to receive communications transmitted using Transmission Control Protocol/Internet Protocol (TCP/IP) or User Datagram Protocol/Internet Protocol (UDP/IP) from the terminal apparatuses 20.

The CPU 101 controls the MFP 10 to transition to (return) to the normal mode, in response to acceptance of an operation for instructing returning to the normal mode from the control panel 130 (the operation unit 132) or in response to reception of data from any extraneous source via the network I/F 140 in the energy saving mode. For example, in response to reception of print data in the energy saving mode, the CPU 101 controls the MFP 10 to transition to the normal mode to cause the printer 122 to perform a printing process. In addition, in response to reception of a communication log (described later) in the energy saving mode, the CPU 101 controls the MFP 10 to transition to the normal mode to store the communication log in a nonvolatile memory such as the HDD 108. The normal mode indicates a state in which electric power is supplied to each of the components of the MFP 10 and the MFP 10 is ready to perform a process using the engine controller 120.

Figure 3:
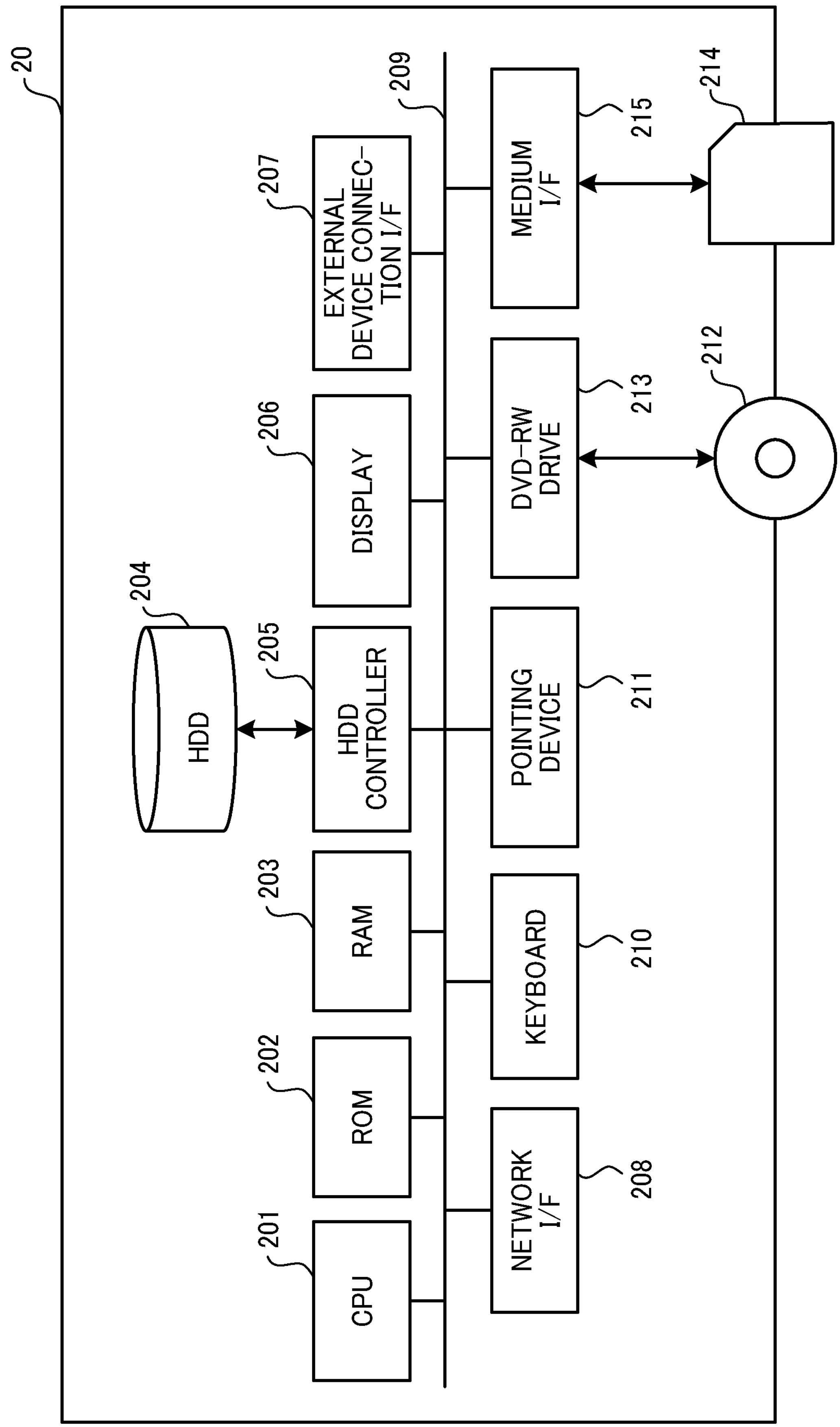
FIG. 3 is a diagram illustrating an example of a hardware configuration of a terminal apparatus according to an embodiment.

FIG. 3 is a diagram illustrating an example of a hardware configuration of the terminal apparatus 20. As illustrated in FIG. 3, the terminal apparatus 20 is implemented by a computer and includes a CPU 201, a ROM 202, a RAM 203, an HDD 204, an HDD controller 205, a display 206, an external device connection I/F 207, a network I/F 208, a bus 209, a keyboard 210, a pointing device 211, a digital versatile disc-rewritable (DVD-RW) drive 213, and a medium I/F 215.

The CPU 201 controls entire operation of the terminal apparatus 20. The ROM 202 stores a program such as an initial program loader (IPL) used for driving the CPU 201. The RAM 203 is used as a work area for the CPU 201. The HDD 204 stores various kinds of data such as a program. The HDD controller 205 controls reading of various kinds of data from or writing of various kinds of data to the HDD 204 under the control of the CPU 201. The display 206 displays various kinds of information such as a cursor, a menu, a window, characters, or an image. The external device connection I/F 207 is an interface used for connecting the terminal apparatus 20 to various external devices. The external devices in this case are, for example, a USB memory and a printer. The network I/F 208 is an interface used for performing data communication with an external apparatus. The bus 209 is an address bus, a data bus, or the like that electrically couples the constituents such as the CPU 201 illustrated in FIG. 3 to one another.

The keyboard 210 is an example of an input device including a plurality of keys that allow a user to input characters, numerals, and various instructions, for example. The pointing device 211 is an example of an input device that allows a user to select or execute various instructions, select a processing target, and move a cursor, for example. The DVD-RW drive 213 controls reading of various kinds of data from or writing of various kinds of data to a DVD-RW 212, which is an example of a removable recording medium. Note that the removable recording medium is not limited to the DVD-RW and may be a digital versatile disc-recordable (DVD-R) or the like. The medium I/F 215 controls reading of data from or writing (storing) of data to a recording medium 214 such as a flash memory.

In the terminal apparatus 20 having the configuration described above, the CPU 201 transmits print data to the MFP 10 in response to reception of an instruction for printing the print data via the keyboard 210 or the pointing device 211, for example.

Figure 4:
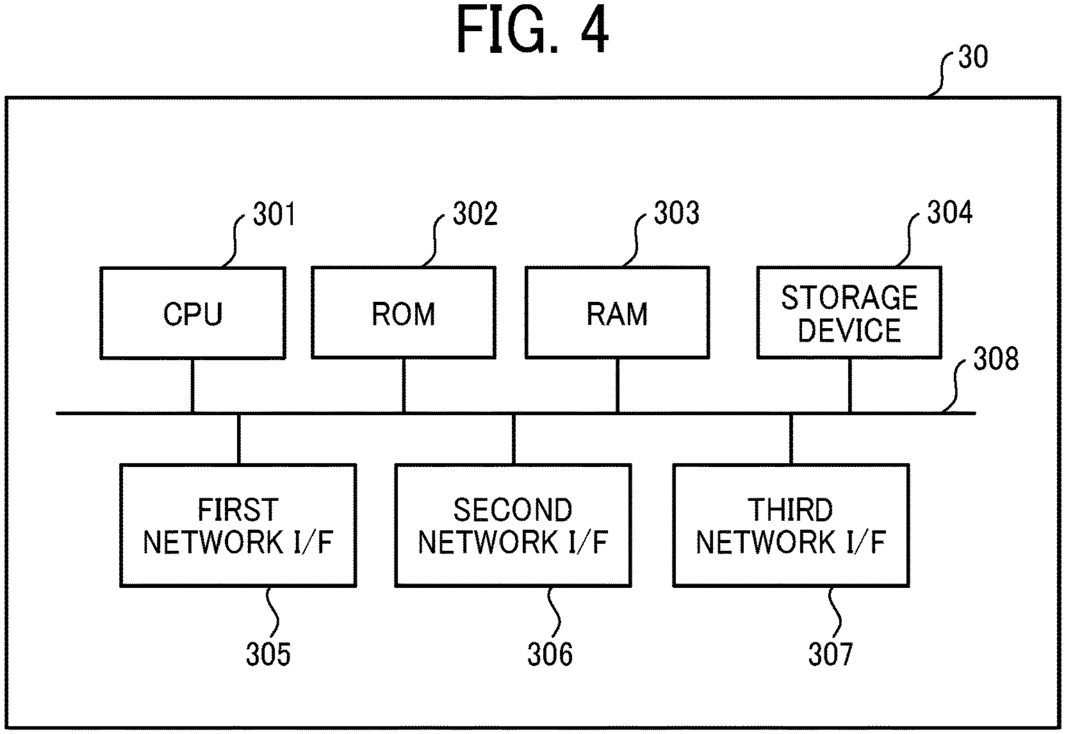
FIG. 4 is a diagram illustrating an example of a hardware configuration of a communication device according to an embodiment.

FIG. 4 is a diagram illustrating an example of a hardware configuration of the communication device 30. As illustrated in FIG. 4, the communication device 30 is implemented by a computer and includes a CPU 301, a ROM 302, a RAM 303, a storage device 304, a first network I/F 305, a second network I/F 306, a third network I/F 307, and a bus 308, for example.

The CPU 301 controls entire operation of the communication device 30. The ROM 302 stores a program such as an IPL for driving the CPU 301. The RAM 303 is used as a work area for the CPU 301. The storage device 304 stores various kinds of data such as a program.

Each of the first network I/F 305, the second network I/F 306, and the third network I/F 307 is an interface used for performing data communication with an external apparatus. Specifically, the first network I/F 305 is connected to the MFP 10 via the network N1 to enable the communication device 30 to communicate with the MFP 10. The second network I/F 306 is connected to the terminal apparatus 20*a* via the network N2 to enable the communication device 30 to communicate with the terminal apparatus 20*a*. The third network I/F 307 is connected to the terminal apparatus 20*b* via the network N3 to enable the communication device 30 to communicate with the terminal apparatus 20*b*.

FIG. 4 illustrates an example of a configuration including three network I/Fs; however, the number of network I/Fs is not limited to three. For example, the communication device 30 may include two network I/Fs, or four or more network I/Fs. Alternatively, the communication device 30 may include a single network I/F if the network I/F is capable of relaying communication performed between a plurality of apparatuses.

The bus 308 is an address bus, a data bus, or the like that electrically couples the constituents such as the CPU 301 illustrated in FIG. 4 to one another.

In the communication device 30 having the configuration described above, the CPU 301 operates in cooperation with the first network I/F 305 to the third network I/F 307 to relay communication performed between information processing apparatuses, specifically, communication performed between the MFP 10 and the terminal apparatuses 20 and communication performed between the terminal apparatuses 20. The CPU 301 temporarily stores a record of communication performed between the information processing apparatuses as a communication log in the RAM 303 or the storage device 304, and transfers the temporarily stored communication log to the MFP 10 serving as a transfer destination apparatus. The MFP 10 stores an operation log of printing or the like. The MFP 10 manages the operation log along with the communication log to implement improved convenience and usability relating to log analysis.

In the communication system 1 having the configuration described above, if the communication device 30 transfers a communication log to the MFP 10 in the energy saving mode, the MFP 10 returns to the normal mode from the energy saving mode. For this reason, if the communication log is transferred frequently, the effect of the energy saving mode may reduce.

Figure 5:
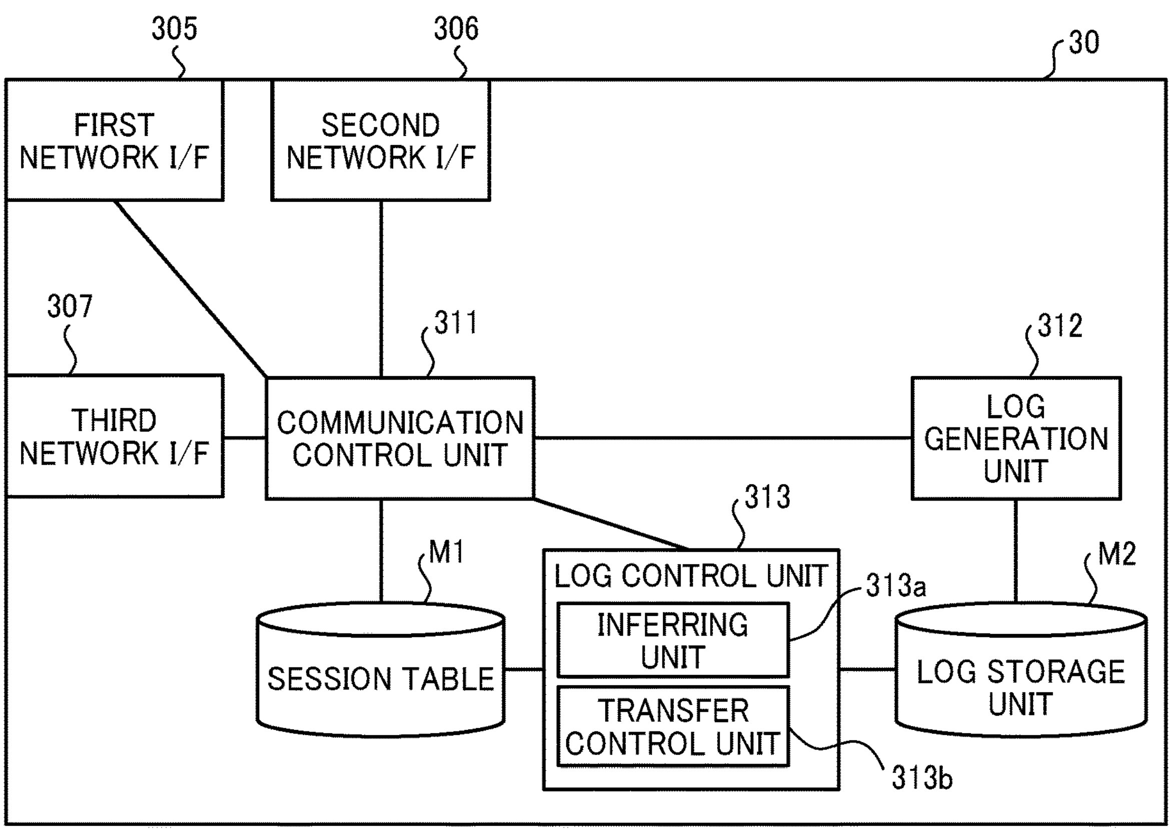
FIG. 5 is a diagram illustrating an example of a functional configuration of the communication device according to an embodiment.

Accordingly, the communication device 30 according to the embodiment further includes a functional configuration illustrated in FIG. 5 to implement efficient communication log transfer. The functional configuration of the communication device 30 will be described below.

FIG. 5 is a diagram illustrating an example of the functional configuration of the communication device 30. As illustrated in FIG. 5, the communication device 30 includes a communication control unit 311, a log generation unit 312, and a log control unit 313 as functional units. The communication device 30 also includes a session table M1 and a log storage unit M2 as storage units relating to the functional configuration. The session table M1 and the log storage unit M2 are storage areas provided in a storage medium such as the RAM 303 or the storage device 304.

The communication control unit 311 analyzes packets input to the first network I/F 305, the second network I/F 306, and the third network I/F 307, and stores information regarding communication performed between the information processing apparatuses that is obtained through the analysis in the session table M1 as session information. In response to occurrence of communication between the MFP 10 and the terminal apparatus 20 or between the terminal apparatuses 20, the communication control unit 311 causes the log generation unit 312 to generate a communication log to record the communication. The communication log is an example of a log.

For example, in response to establishment of a communication session (connection) based on TCP/IP, the communication control unit 311 stores IP addresses and port numbers of a communication source apparatus and a communication destination apparatus and a protocol type in the session table M1 as session information. In the case of communication based on UDP/IP, for example, the communication control unit 311 determines that a session is established in response to occurrence of the communication, and stores IP addresses and port numbers of a communication source apparatus and a communication destination apparatus and a protocol type in the session table M1 as session information.

FIG. 6A and FIG. 6B are diagrams each illustrating an example of the session information stored in the session table M1. As illustrated in FIG. 6A and FIG. 6B, the session table M1 includes an IP address and a port number (destIPaddr:port) of a transmission destination, an IP address and a port number (srcIPaddr:port) of a transmission source, and a protocol type (protocol) as items of the session information. Note that the numeral on the left end field is an index for identifying corresponding session information.

Whenever communication occurs between the information processing apparatuses (between the MFP 10 and each of the terminal apparatuses 20 or between the terminal apparatuses 20), the communication control unit 311 stores session information regarding the communication in the session table M1. The session information (row) is stored in the session table M1 for a predetermined storage period. After the predetermined storage period passes, the session information is automatically deleted under the control of the communication control unit 311 or the CPU 301. Such a storage period may be set to any value but is preferably a period corresponding to a standby time period from when a no-operation state starts in the MFP 10 to when the MFP 10 transitions to the energy saving mode.

FIG. 6A indicates a state of the session table M1 at a certain time point. In FIG. 6A, all entries assigned indices #1 to #4 indicate communication based on UDP. The session information in which the protocol type is UDP (entries assigned the indices #1 to #4) indicates that communication is performed from the terminal apparatuses 20 (20*a* and 20*b*) to the MFP 10 based on Simple Network Management Protocol (SNMP) using a port number of 161.

FIG. 6B indicates a state of the session table M1 at a certain time point after the time point of the state illustrated in FIG. 6A. In FIG. 6B, entries assigned indices #1, #3, and #4 indicate communication based on UDP. In addition, an entry assigned an index #2 indicates communication based on TCP. The session information in which the protocol type is TCP (entry assigned the index #2) indicates that print data is transmitted from the terminal apparatus 20 (20*b*) to the MFP 10 based on the printing protocol using a port number of 9100.

Note that the session information for TCP/IP-based communication may be deleted by the communication control unit 311 at a detection timing of a flag indicating the end of the session (for example, a FIN flag or RST flag).

Referring again to FIG. 5, the log generation unit 312 generates a record of communication performed between the information processing apparatuses (between the MFP 10 and each of the terminal apparatuses 20 and between the terminal apparatuses 20) as a communication log and stores the generated communication log in the log storage unit M2. Specifically, the log generation unit 312 generates a communication log in response to an instruction given by the communication control unit 311 and stores the generated communication log in the log storage unit M2. It is assumed that a buffer size (storage capacity) of the log storage unit M2 is predetermined.

FIG. 7 is a diagram illustrating an example of a communication log stored in the log storage unit M2. As illustrated in FIG. 7, the communication log includes, as items, time of communication (time), an IP address and a port number (destIPaddr:port) of a transmission destination, an IP address and a port number of a transmission source (srcIPaddr:port), and a protocol type (protocol). Note that the communication log illustrated in FIG. 7 corresponds to the session information illustrated in FIG. 6A and FIG. 6B and is stored in chronological order of communication.

In the embodiment, a communication log regarding communication performed between the information processing apparatuses is stored; however, a log to be stored is not limited to the communication log. A log regarding an operation for the communication device 30 such as an access to the communication device 30 may be stored in a format similar to the format of the communication log. FIG. 6A, FIG. 6B, and FIG. 7 illustrate an example in which communication from the terminal apparatuses 20 to the MFP 10 is recorded. It is assumed that communication from the MFP 10 to the terminal apparatus 20 and communication between the terminal apparatuses 20 are also recorded in a similar manner.

Referring again to FIG. 5, the log control unit 313 performs control to transfer the communication log stored in the log storage unit M2 to the MFP 10. Specifically, the log control unit 313 includes an inferring unit 313*a* and a transfer control unit 313*b*.

The inferring unit 313*a* infers which of the normal mode or the energy saving mode the operation state of the MFP 10 is, on the basis of the session information relating to the MFP 10 serving as the transfer destination apparatus out of the session information stored in the session table M1, that is, out of communication performed in a predetermined latest period. The method for inferring the operation state may be any method, and various methods may be adopted. In addition, the predetermined latest period is determined in advance by, for example, a designer or a user.

For example, data such as print data is usually transmitted and received using a TCP/IP-based protocol. Therefore, the operation state of the MFP 10 is successfully inferred by checking whether there is communication for which the protocol type is TCP out of the communication performed in the predetermined latest period. Specifically, the inferring unit 313*a* infers whether the operation state of the MFP 10 is the normal mode or the energy saving mode depending on whether session information in which the protocol type is "TCP" is stored in the session table M1. For example, in the case where all the protocol types of the session information stored in the session table M1 are "UDP" as illustrated in FIG. 6A, that is, in the case where there is no session information in which the protocol type is "TCP" in the session table M1, the inferring unit 313*a* infers that the MFP 10 is in the energy saving mode. In the case where session information in which the protocol type is "TCP" is stored in the session table M1 as illustrated in FIG. 6B, the inferring unit 313*a* infers that the MFP 10 is in the normal mode.

In addition, for example, print data is usually transmitted and received using the TCP/IP-based printing protocol (port number: 9100). Therefore, the operation state of the MFP 10 is successfully inferred by checking whether there is communication based on the printing protocol out of the communication performed in the predetermined latest period. Specifically, the inferring unit 313*a* infers whether the operation state of the MFP 10 is the normal mode or the energy saving mode depending on whether session information in which the protocol type is "TCP" and the port number is "9100" is stored in the session table M1. For example, in the case where there is no session information having such a protocol type and such a port number out of the session information stored in the session table M1 as illustrated in FIG. 6A, the inferring unit 313*a* infers that the MFP 10 is in the energy saving mode. In the case where there is session information having such a protocol type and such a port number in the session table M1 as illustrated in FIG. 6B, the inferring unit 313*a* infers that the MFP 10 is in the normal mode.

The inferring unit 313*a* may infer whether the MFP 10 is in the normal mode or the energy saving mode on the basis of a combination other than the aforementioned combination of the protocol type of "TCP" and the port number of "9100". For example, in the case where there is session information relating to a request for a process performed by the engine controller 120 such as transfer of a scanned image from the MFP 10 to the terminal apparatus 20 in the session table M1, the inferring unit 313*a* may determine that the MFP 10 is in the normal mode.

In the embodiment, the inferring unit 313*a* infers the operation state of the MFP 10 on the basis of the session information stored in the session table M1; however, the configuration is not limited to this configuration. The inferring unit 313*a* may infer the operation state of the MFP 10 on the basis of the communication log stored in the log storage unit M2. In this case, the inferring unit 313*a* extracts communication logs of communication performed within a predetermined latest period, on the basis of the time included in the communication logs. The inferring unit 313*a* then infers the operation state of the MFP 10 on the basis of the content of a communication log of communication performed between the MFP 10 and the terminal apparatus 20 among the extracted communication logs.

On the basis of the operation state of the MFP 10 inferred by the inferring unit 313*a*, the transfer control unit 313*b* performs control to transfer the communication logs stored in the log storage unit M2 to the MFP 10. Specifically, when it is inferred that the MFP 10 is in the normal mode, the transfer control unit 313*b* operates in cooperation with the communication control unit 311 to transfer the communication logs stored in the log storage unit M2 to the MFP 10. When it is inferred that the MFP 10 is in the energy saving mode, the transfer control unit 313*b* postpones transfer of the communication logs.

A timing and the number of times the transfer control unit 313*b* actually transfers the communication logs are not limited to a particular timing and a particular value, respectively, and may be set in a given manner. For example, a setting may be made such that the communication logs are transferred whenever it is inferred that the MFP 10 is in the normal mode. Alternatively, a setting may be made such that the communication logs are transferred, for example, once a day or after a predetermined period (for example, one hour) or longer passes from the last transfer.

The transfer control unit 313*b* monitors the state of the log storage unit M2 and determines that the log storage unit M2 is full of logs when an amount of stored communication logs reaches a predetermined upper limit (90% of the buffer size, for example) or when the number of stored communication logs reaches a predetermined value. In such a case, the transfer control unit 313*b* immediately transfers the communication logs irrespective of the operation state of the MFP 10. In this way, the occurrence of a missed communication log can be avoided, and the communication log can be acquired (stored) reliably.

Figure 8:
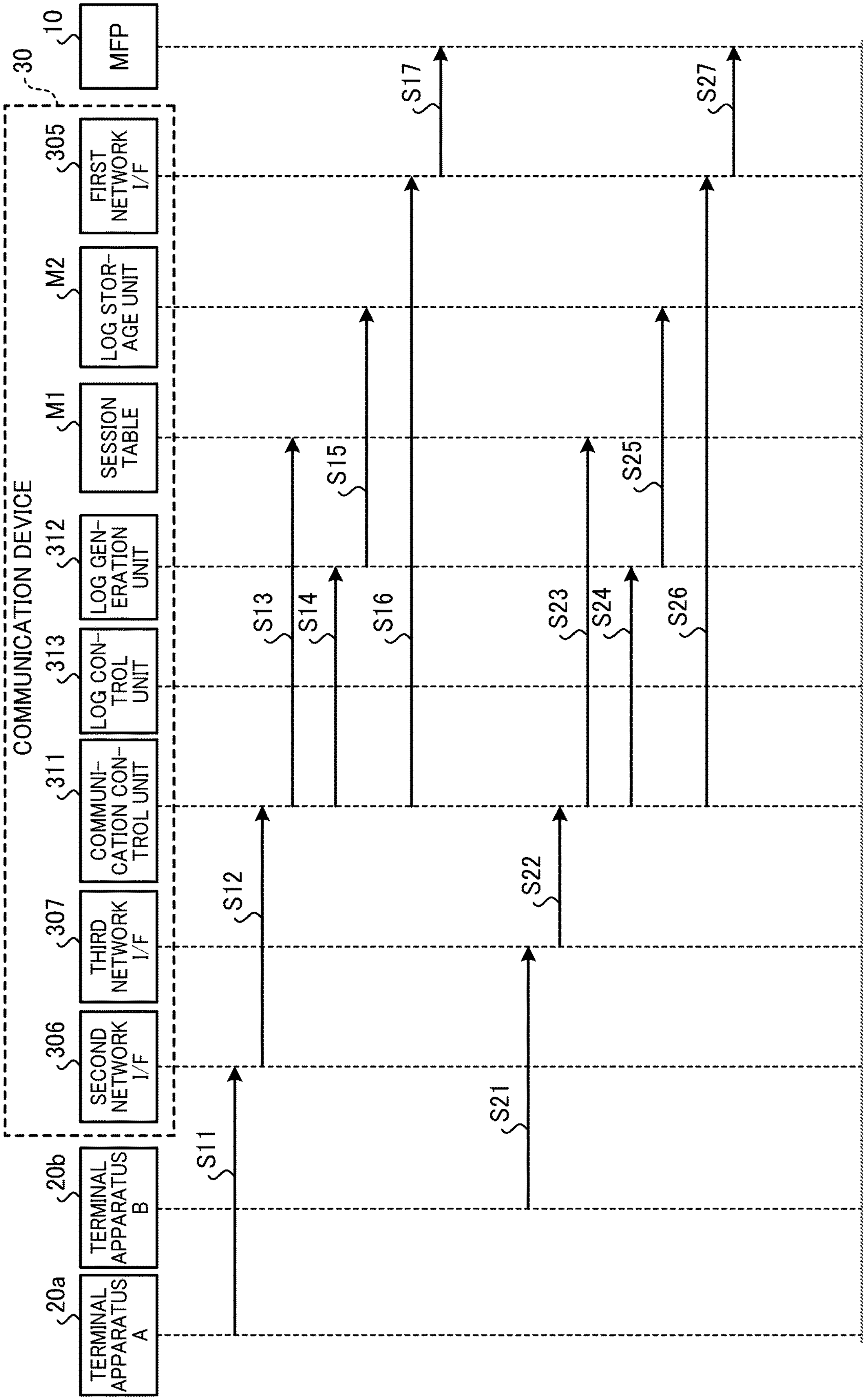
FIG. 8 is a sequence diagram illustrating an example of a relay operation performed by the communication device according to an embodiment.

An operation performed by the communication device 30 described above will be described below. FIG. 8 is a sequence diagram illustrating an example of a relay operation performed by the communication device 30.

In response to the terminal apparatus 20*a* transmitting a packet to the MFP 10, the second network I/F 306 of the communication device 30 receives the transmitted packet (step S11). The communication control unit 311 analyzes the packet received by the second network I/F 306 (step S12), and stores the analysis result as session information in the session table M1 (step S13) The log generation unit 312 generates a communication log in response to a generation instruction given by the communication control unit 311 (step S14), and stores the generated communication log in the log storage unit M2 (step S15). The communication control unit 311 then transfers the packet received by the second network I/F 306 to the first network I/F 305 (step S16). The first network I/F 305 transmits the packet transferred from the second network I/F 306, to the MFP 10 serving as the addressee (step S17).

A packet transmitted from the terminal apparatus 20*b* to the MFP 10 is also processed in the similar manner. Specifically, in response to the terminal apparatus 20*b* transmitting a packet to the MFP 10, the third network I/F 307 of the communication device 30 receives the transmitted packet (step S21). The communication control unit 311 analyzes the packet received by the third network I/F 307 (step S22), and stores the analysis result as session information in the session table M1 (step S23). The log generation unit 312 generates a communication log in response to a generation instruction given by the communication control unit 311 (step S24), and stores the generated communication log in the log storage unit M2 (step S25). The communication control unit 311 then transfers the packet received by the third network I/F 307 to the first network I/F 305 (step S26). The first network I/F 305 transmits the packet transferred from the third network I/F 307, to the MFP 10 serving as the addressee (step S27).

Figure 9:
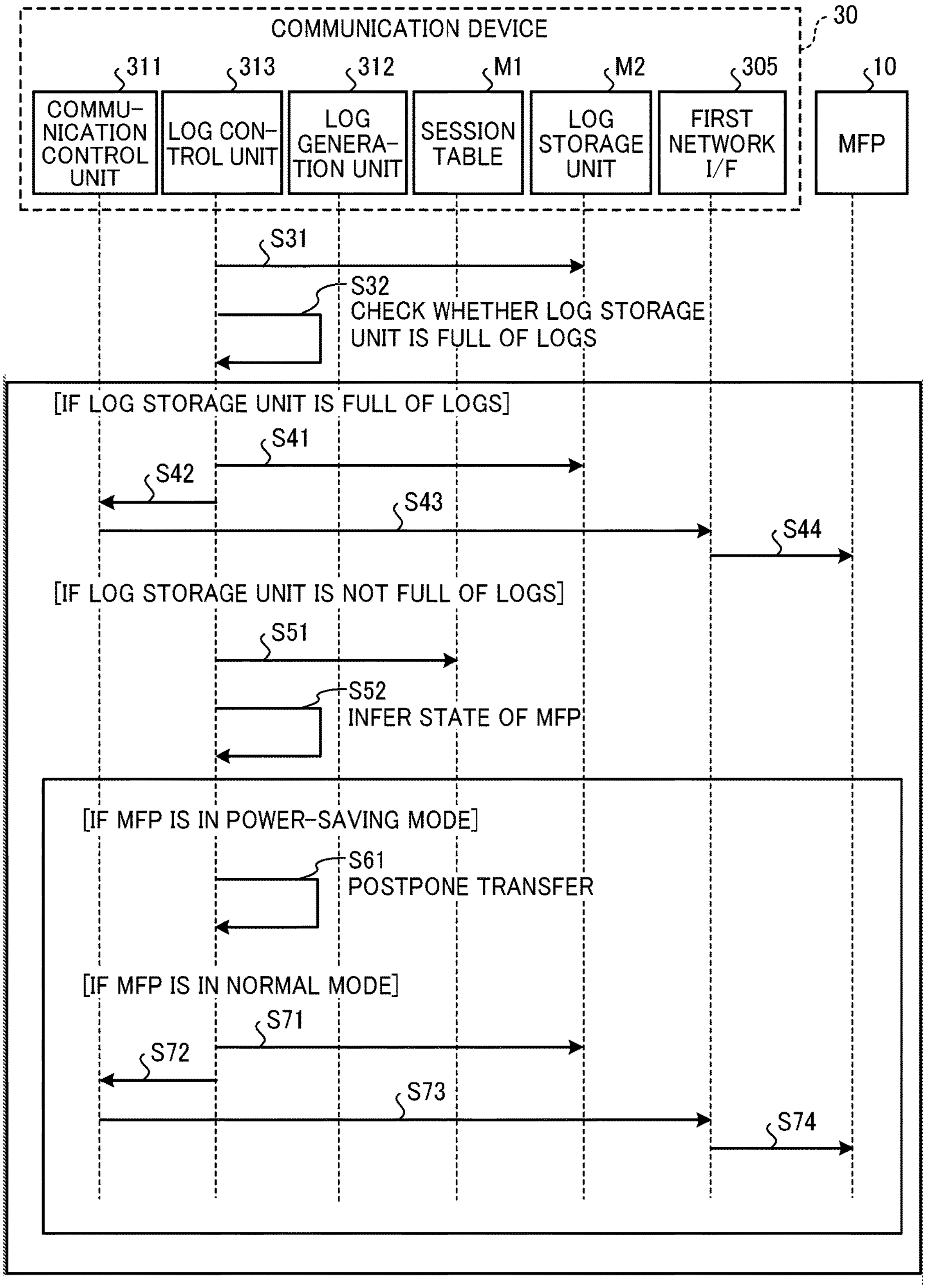
FIG. 9 is a sequence diagram illustrating an example of a communication log transfer operation performed by the communication device according to an embodiment.

An operation performed by the communication device 30 to transfer communication logs to the MFP 10 will be described next with reference to FIG. 9. FIG. 9 is a sequence diagram illustrating an example of a communication log transfer operation performed by the communication device 30.

First, when a determination timing at which it is determined whether to transfer logs is reached, the log control unit 313 checks a remaining free space of the log storage unit M2 (step S31) and determines whether the log storage unit M2 is full of communication logs (step S32).

If the log storage unit M2 is full of communication logs, the log control unit 313 acquires the communication logs from the log storage unit M2 (step S41), and instructs the communication control unit 311 to transfer the communication logs to the MFP 10 (step S42). In response to the instruction given by the log control unit 313, the communication control unit 311 transfers the communication logs acquired from the log storage unit M2 to the WP 10 via the first network I/F 305 (steps S43 and S44).

If the log storage unit M2 is not full of communication logs, the log control unit 313 (the inferring unit 313*a*) refers to the session table M1 (step S51) and infers the operation state of the MFP 10 from contents of communication performed in a predetermined latest period on the basis of the session information stored in the session table M1 (step S52).

If it is inferred that the MFP 10 is in the energy saving mode, the log control unit 313 (the transfer control unit 313*b*) postpones transfer of the communication logs (step S61). In this case, the log control unit 313 postpones transfer of the communication logs until the next determination timing.

If it is inferred that the MFP 10 is in the normal mode, the log control unit 313 (the transfer control unit 313*b*) acquires the communication logs from the log storage unit M2 (step S71) and instructs the communication control unit 311 to transfer the communication logs to the MFP 10 (step S72). In response to the instruction given by the log control unit 313, the communication control unit 311 transfers (transmits) the communication logs acquired from the log storage unit M2 to the MFP 10 via the first network I/F 305 (steps S73 and S74).

As described above, the communication device 30 generates a record of communication performed between information processing apparatuses as a communication log and stores the generated communication log in the log storage unit M2. In addition, the communication device 30 infers the operation state of the MFP 10 on the basis of contents of communication performed between the terminal apparatuses 20 and the MFP 10 serving as the transfer destination of the communication logs in a predetermined latest period. When the MFP 10 is in the normal mode, the communication device 30 transfers the communication logs stored in the log storage unit M2 to the MFP 10. When the MFP 10 is in the energy saving mode, the communication device 30 postpones transfer of the communication logs.

Consequently, communication logs can be transferred when the MFP 10 is in the normal mode and transfer of communication logs can be postponed when the MFP 10 is in the energy saving mode in this embodiment. Thus, the MFP 10 can be kept in the energy saving mode and the communication logs can be efficiently transferred. In addition, the communication device 30 dynamically changes a period in which communication logs are transferred (log transfer permitted period) in accordance with the operation state of the MFP 10. Thus, the log transfer permitted period can be extended as much as possible, and the communication logs can be transferred efficiently.

The communication device 30 is a communication device that relays communication performed between information processing apparatuses in the present embodiment; however, the communication device 30 is not limited to such a communication device and may be a communication device that captures communications such as packets. In addition, a configuration may be adopted in which one of the information processing apparatuses (for example, the terminal apparatus 20*a*) may include the functional configuration of the communication device 30 and transfers communication logs to another information processing apparatus (for example, the MFP 10) serving as the transfer destination.

When a communication device having the configuration as described in the description of the related art transfers a log to an information processing apparatus that is in the energy saving mode, the information processing apparatus transitions to a normal operation mode in order to store the transferred log in a storage device. Thus, if the log is transferred frequently, the effect of the energy saving mode may reduce. Since the techniques of the related art do not enable a communication device to determine an operation state of an information processing apparatus, the communication device may transfer a log to the information processing apparatus that is in the energy saving mode.

According to one or more embodiments of the present disclosure, efficient log transfer is successfully implemented.

Each of the functions of the described embodiments may be implemented by one or more processing circuits or circuitry.

Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

When at least one of the functions described in the embodiment above is implemented as a result of execution of a program, the program is provided after being stored in advance in an appropriate storage device. Alternatively, the program may be provided after being stored on a computer-readable recording medium, such as a CD-ROM, a flexible disk (FD), a CD-R, or a DVD, as a file of an installable or executable format. Alternatively, the program may be stored on a computer connected to a network such as the Internet and may be downloaded and provided via the network. The program may be provided or distributed via a network such as the Internet. The program may have a module configuration including at least one of the functions described above.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above.

What is claimed is:

1. A communication device configured to relay or capture communication performed between a plurality of information processing apparatuses communicable with one another via a network, the communication device comprising circuitry configured to:

generate a log indicating a record of the communication performed between the plurality of information processing apparatuses;

store the generated log in a memory;

infer which one of a normal mode or and energy saving mode an operation state of a transfer destination device is, based on content of communication performed between a transfer destination apparatus and another information processing apparatus in a predetermined latest period, the transfer destination apparatus being a particular information processing apparatus to which the log is to be transferred among the plurality of information processing apparatuses, the another information processing apparatus being another particular information processing apparatus other than the transfer destination apparatus among the plurality of information processing apparatuses; and controls transfer of the log based on a result obtained by inferring by the circuitry, so that the circuitry transfers the log to the transfer destination apparatus in a case where the result indicates the normal mode, and the circuitry postpones a transfer of the log in a case where the result indicates the energy saving mode.

2. The communication device of claim 1, wherein the circuitry is further configured to infer the operation state of the transfer destination apparatus based on a protocol used in the communication performed in the predetermined latest period.

3. The communication device of claim 2, wherein the circuitry is further configured to infer that the transfer destination apparatus is in the normal mode in a case where the communication performed in the predetermined latest period includes communication performed using TCP.

4. The communication device of claim 2, wherein the circuitry is configured to infer that the transfer destination apparatus is in the normal mode in a case where the communication performed in the predetermined latest period includes communication performed using TCP and a predetermined port number.

5. The communication device of claim 2, wherein the circuitry is further configured to infer that the transfer destination apparatus is in the energy saving mode in a case where all the communication performed in the predetermined latest period is communication performed using UDP.

6. The communication device of claim 1, wherein in response to a number of logs stored in the memory or an amount of logs stored in the memory reaching a predetermined upper limit, the circuitry is further configured to transfer the logs stored in the memory to the transfer destination apparatus irrespective of the operation state of the transfer destination apparatus.

7. The communication device according of claim 1, wherein the circuitry is further configured to:

store session information indicating information concerning the communication performed in the predetermined latest period in the memory; and infer the operation state of the transfer destination apparatus based on the session information stored in the memory.

8. A log transfer method performed by a communication device configured to relay or capture communication performed between a plurality of information processing apparatuses communicable with one another via a network, the log transfer method comprising:

generating a log indicating a record of the communication performed between the plurality of information processing apparatuses;

storing the generated log in a memory;

inferring which one of a normal mode and an energy saving mode an operation state of a transfer destination device is, based on content of communication performed between a transfer destination apparatus and another information processing apparatus in a predetermined latest period, the transfer destination apparatus being a particular information processing apparatus to which the log is to be transferred among the plurality of information processing apparatuses, the another information processing apparatus being another particular information processing apparatus other than the transfer destination apparatus among the plurality of information processing apparatuses; and controlling transfer of the log based on a result obtained by the inferring, so that the log is transferred to the transfer destination apparatus in a case where the result indicates the normal mode, and the transfer of the log is postponed in a case where the result indicates the energy saving mode.

9. A communication system comprising:

a plurality of information processing apparatuses communicable with one another via a network; and the communication device of claim 1.

* * * * *